(12) United States Patent
Rao et al.

(10) Patent No.: US 8,785,529 B2
(45) Date of Patent: Jul. 22, 2014

(54) NUCLEATING AGENTS FOR POLYOLEFINS BASED ON METAL SALTS

(75) Inventors: Gandham Satya Srinivasa Rao, Maharashtra (IN); S. Muthukumaru Pillai, Maharashtra (IN); Virendra Kumar Gupta, Maharashtra (IN)

(73) Assignee: Reliance Industries Limited, Mumbai, Maharashtra (IN)

( * ) Notice: Subject to any disclaimer, the term of this patent is extended or adjusted under 35 U.S.C. 154(b) by 0 days.

(21) Appl. No.: 13/522,111

(22) PCT Filed: Jan. 14, 2011

(86) PCT No.: PCT/IN2011/000028
§ 371 (c)(1),
(2), (4) Date: Jul. 13, 2012

(87) PCT Pub. No.: WO2011/086582
PCT Pub. Date: Jul. 21, 2011

(65) Prior Publication Data
US 2012/0289632 A1    Nov. 15, 2012

(30) Foreign Application Priority Data
Jan. 15, 2010 (IN) .......................... 1893/MUM/2009

(51) Int. Cl.
*C08K 5/55* (2006.01)
*C07F 5/02* (2006.01)

(52) U.S. Cl.
USPC ................ 524/183; 524/404; 524/405; 562/7

(58) Field of Classification Search
CPC ........ C08K 5/0083; C08K 5/025; C07F 5/025
USPC .............................................. 524/183; 562/7
See application file for complete search history.

(56) References Cited

U.S. PATENT DOCUMENTS

| | | | |
|---|---|---|---|
| 3,131,164 A * | 4/1964 | Doyle et al. .................. | 524/183 |
| 3,177,244 A | 4/1965 | Schmerling et al. | |
| 3,193,521 A * | 7/1965 | Jasching ........................ | 524/84 |
| 5,342,868 A | 8/1994 | Kimura et al. | |
| 7,358,309 B2 * | 4/2008 | Sullivan et al. ............... | 525/251 |

FOREIGN PATENT DOCUMENTS

WO    WO 2005019229 A1 *  3/2005

\* cited by examiner

*Primary Examiner* — Brieann R Fink
(74) *Attorney, Agent, or Firm* — Tim Tingkang Xia, Esq.; Morris, Manning & Martin, LLP

(57) ABSTRACT

Described herein are novel metal salts capable as nucleating agents for polyolefins. The present invention relates to such salts synthesized by reacting potassium hydroxide with carboxylic acids and further, to the achievement of high crystallization temperatures in polypropylene compositions upon dispersal therein of formulations containing one or more of the said metal salts.

5 Claims, No Drawings

NUCLEATING AGENTS FOR POLYOLEFINS BASED ON METAL SALTS

FIELD OF THE INVENTION

This invention relates generally to metal salts useful as nucleating agents for polyolefins and more particularly to novel metal salts obtained by reacting metal hydroxides with organic acids and further, to improvements realized by use of one or more of said metal salts as nucleating agents for various polypropylene formulations.

BACKGROUND OF THE INVENTION

The term polyolefins here refers to mostly homo and random copolymers of polypropylene (PP). These polyolefins are used for various end use applications such as storage containers, medical devices, food packages, plastic tubes and pipes etc. In polyolefins, the uniformity in arrangement of crystals upon crystallization is a necessity to provide an effective, durable, and versatile polyolefin article. In order to achieve such desirable physical properties, it has been known that addition of certain compounds which provide nucleation sites for polyolefin crystal growth during moulding or fabrication. The polymers containing such nucleating compounds crystallize at a much faster rate than virgin polyolefin. Increase in crystallization temperature results in reduced cycle times. The nucleators provide nucleation sites for crystal growth during cooling of a polyolefin from molten state. The presence of nucleation sites can also provide clarification to the targeted polyolefin if the crystallites formed are uniform and smaller than the wave length of light. Thus, nucleating agents are very important to the polyolefin industry where obtaining faster, homogeneous crystallization and clarity are some of the critical requisites. Thermal stability, solubility among nucleation compositions, possession of surface topology capable of achieving nucleation, ability to induce nucleation with high clarity at low concentrations and avoidance of haze are few more of the desired properties of ideal nucleating agents and an object for achievement of such is truly a pressing need of art.

Study of the art reveals efforts towards attainment of the said properties. Inorganic compounds like pulverized clay, silicates, alkali salts, alkaline earth salts, aluminum salts, titanium salts, metal oxides and organic compounds including γ-quinacridone, 2-mercaptobenzimidazole, sorbitol/phosphate derivatives find mention in the art. However, these have not been able to satisfactorily and comprehensively address said problems of art.

Metal salts of organic acids are one of the major types of nucleating agents. Wijga in U.S. Pat. Nos. 3,207,736, 3,207.738 and Wales in U.S. Pat. Nos.3,207,737, 3,207,739 disclosed various aromatic carboxylic, dicarboxylic or higher polycarboxylic acids, their corresponding anhydrides and metal salts as nucleating agents for polyolefins. Blends of monocarboxylic and dicarboxylic acid are also used as nucleating agents for polypropylene in biaxially oriented films as disclosed in U.S. Pat. No. 6,733,719. The most cheap and commercially used nucleating agent for polyolefins is sodium benzoate, which has strong nucleating ability and low cost for the target polyolefins. Doston Darin et al disclosed metal salts of hexahydrophthalic acid as nucleating additives in U.S. Pat. Nos. 6,562,890 and 6,599,971. Metal salts of hexahydrophthalic acid at low concentrations also gives β-axis crystalline orientation which in turn improves stiffness-impact properties as disclosed in U.S. Pat. No. 7,144,939. The most effective nucleating agents with high crystallization temperatures are disodium bicyclo [2.2.1] heptane dicarboxylate metal salts and their compositions are disclosed in U.S. Pat. Nos. 6,465,551, 6,946,507. They were produced by Milliken & Company under trade name HPN-68. Salts based on camphanic acid assigned to Minnesota Mining and Manufacturing in PCT Application WO 98/29494, 98/29495 and 98/29496 are other type of nucleating agents.

Cyclic bis-phenol phosphates are another type of nucleating and clarifying agents suggested by Yutaka Nakahara et al. in U.S. Pat. No. 4,463,113 and Ryoji Kimura et al in U.S. Pat. No. 5,342,868 for polyolefins. Sodium 2, 2'-methylene-bis-(4, 6-di-tert-butylphenyl) phosphate (NA-11) and Aluminium bis [2, 2'-methylene-bis-(4, 6-di-tert-butylphenyl) phosphate (NA-21) are two popular products under this category. Many others commonly known compounds are kaolin, talc etc which show high polyolefin crystallization temperatures but exhibit many drawbacks for industrial applications. For example, Camphanic acid exhibits high peak crystallization temperature in PP homopolymer formulations but exhibits very poor thermal stability and plate out during processing. Sometimes sodium benzoate, NA-11, exhibit deleterious nucleating efficiency when used in combination with calcium stearate. This is due to calcium ion from the stearate transfers position with the sodium ions of the nucleating agents, rendering the nucleating agents ineffective. Non-ionic acid neutralizers, such as dihydrotalcite (DHT4-A) used in conjunction with such nucleators reduce the above effects aesthetic characteristics, haze and higher costs. Other problems include dispersion, agglomeration of nucleating agent's leads to inconsistent nucleation, stiffness and impact variation in the polyolefin. DBS derivatives exhibit plate-out at high processing temperatures and if the aromatic rings are mono-substituted, show improved thermal stability but show organoleptic properties and as a result they cannot be used in medical devices and food packaging.

To address some of these problems there is still a need in the plastics industry to discover new compounds that do not exhibit some of the above problems and provide excellent peak crystallization temperatures with polyolefins.

OBJECTS OF THE INVENTION

It is an object of the present invention to synthesise new nucleating agents.

Another object of present invention is to use the synthesised novel metal salts as nucleating agents for polyolefins.

A further object of the invention is to provide compositions based on these nucleating compounds which exhibit high peak crystallization temperatures with polypropylene homo and polypropylene random copolymer. Among the metal cations potassium is the most preferred.

SUMMARY OF THE INVENTION

Accordingly, this invention encompasses a nucleating agent, which induces a peak crystallization temperature (Tc) of at least 112° C., more preferably, 113° C. with a high Tc temperature of about 119° C. for random copolymer polypropylene formulation wherein the unnucleated polypropylene exhibits a melt flow of 12 g/10 min and peak crystallization temperature 109° C. measured by differential scanning calorimeter.

Additionally, this invention also encompasses a nucleating agent, which induces a standard peak crystallization temperature of at least 120° C. in a polypropylene homopolymer, wherein the unnucleated polypropylene random copolymer exhibits a melt flow of about 3 g/10 min and peak crystallization of 116° C.

DETAILED DESCRIPTION OF THE INVENTION

The novel metal salts are prepared by reacting corresponding acids with potassium hydroxide dissolved in water. The product was dried by removing water under vacuum. In particular is described the salt of boric acid derivative. Various compositions were made by blending the synthesised novel metal salts separately with polyolefins. Various standard additives like antioxidants, acid scavengers, and dispersing agents were also added. All the compositions were compounded in a high speed branbery mixer and extruded in single screw extruder of Brabender Plasticorder. The synthesised metal salts provide excellent high peak crystallization temperatures in a variety of polyolefin formulations, particularly within polypropylene random copolymer and polypropylene homopolymer.

The inventive metal salts are thus added to the polyolefin in an amount from about 50 ppm to about 10000 ppm by weight, most preferably from about 500 ppm to about 5000 ppm in order to provide the aforementioned beneficial characteristics.

The polyolefin polymers of the present invention may include aliphatic polyolefins and copolymers made from at least one aliphatic olefin and one or more co-monomers. Generally, the co-monomers, if present, will be provided in a minor amount, e.g., about 10 percent or less or even about 5 percent or less, based upon the weight of the polyolefin (e.g. Polypropylene random copolymer). Examples of olefin polymers whose nucleation can be improved conveniently according to the present invention are polymers and copolymers of aliphatic mono olefins containing 2 to about 6 carbon atoms which have an average molecular weight of from about 10,000 to about 2,000,000, preferably from about 30,000 to about 300,000, such as, without limitation, isotactic polypropylene, polypropylene random copolymer with ethylene, 1-hexene, 1-octene etc as comonomers.

Preferred Embodiments of the Invention

Examples based on the synthesis of nucleating agents and their compositions within the scope of the present invention are presented hereinafter. It will be amply evident to a person skilled in the art that these embodiments are for illustration purposes only and do not limit the scope of the present invention.

EXAMPLE 1

Synthesis of Potassium cyclohexane carboxylate

To a solution of KOH (1.12 g) in 10 ml of demineralised water, cyclohexane carboxylic acid (2.56 g) was added slowly and stirred at room temperature for 4 h gave 3 g of potassium salt of cyclohexane carboxylic acid. The water was removed under vacuum at 75° C. A white crystalline solid obtained which showed m. pt. 310° C. C=50%, H=6.6%

EXAMPLE 2

Synthesis of Potassium Phenyl Borate

To a solution of KOH (1.12 g) in 10 ml of demineralised water, 1.22 g of phenyl boronic acid was added slowly till it was dissolved and the solution was stirred well at 50° C. for 4 h. Water was removed under vacuum at 75° C. to give a (2.4 g) white powder. The product showed m.pt. 156-160°C.

EXAMPLE 3

Synthesis of Potassium Nicotinate

To a solution of KOH (1.12 g) in 10 ml of demineralised water, Nicotinic acid was added and stirred well at 50° C. for 3 h. Water was removed in a rotavapour. The solid was dried under vacuum at 120° C. to remove final traces of water to give 3.1 g of white solid with m.pt >325° C.

EXAMPLE 4

Nucleation Reaction Standards

Polypropylene random copolymer (PRCP, unstabilized, 400 g, MI-12 from M/s Reliance Industries Limited, Hazira, Gujarat, India) was dry blended with 0.20 g of Irganox 1010, 0.32 g, 0.08 g Hydrotalcite DHT 4A, 0.16 g Glycerol Monostearate (Finstate 9500), 0.20 g calcium stearate and 0.80 g of nucleating agent in a high speed ribbon mixer at 80 RPM and extruded in single screw extruder of Brabender Plasticorder with a temperature profile of 170-20.0-230 225° C. and 60 RPM. The extrudates were cooled, pelletized and dried for 2 h at 80° C. and molded. The synthesized metal salts were tested and compared with standard nucleating agents like Millard 3988, NA-21, Sodium Benzoate, and Potassium Benzoate. All the synthesised metal salts were tested as Nucleating agents. The typical compositions are given in Table 1.

EXAMPLE 5

Additional Standards for Nucleation

Vaseline oil (1 g) was taken in a ribbon mixer and heated to 120° C. under nitrogen. Irganox 1010 (0.5 g), Irganox 1076 (0.35 g), Irgafos PEPQ (0.15 g), Irgafos 168 (0.1 g) and 2.0 g of Dibenzylidene Pentaerythritol were added and heated for 5 min. To this mixture of additives, unstabilized polypropylene homopolymer (1000 g, Melt Index 3), calcium stearate (0.5 g) was added and mixed for 30 min for homogenization. The compounded material was extruded in single screw extruder of Brabender Plasticorder with a temperature profile of 170-200-230-225° C. and 60 RPM. The extrudates were cooled, palletized, dried and moulded.

Nucleation Efficiency Test

The Polyolefin compositions made in Examples 4 and 5 comprising the synthesised nucleating agents, Polypropylene random copolymer (PRCP), Polypropylene homopolymer (PP) and additives were subjected to nucleation efficiency test. The Peak Crystallization Temperatures (Tc) and Melting Temperatures (Tm) were measured on Differential Scanning calorimeter. The Tc was measured by heating the sample from 50° C. to 220° C. with a heating rate of 10° C./min and then held for 5 min at 220° C. and then again cooled the sample at the same rate until it reached the room . temperature. The important crystallization temperatures were thus measured as the peak maxima during the individual crystallization exotherms for each sample. Polyolefins such as un-nucleated. Polypropylene Random copolymer showed a crystallization temperature of about 109° C. where as with the addition of nucleating agents the Tc value increased to as high as 119° C. depending on the type of nucleating agent added. The super cooling $\Delta T$ ($\Delta T=Tm-Tc$) i.e. the difference between the melting temperature and crystallization temperature which is a function of overall rate of crystallization was measured. The smaller is the difference between these temperatures, the greater is the rate of crystallization. The efficiency of various nucleating agents was evaluated by measuring the Tm, Tc and ΔT as given in Tables 2-3.

TABLE 1

Typical composition of Polypropylene with Nucleating Agents

| S. No. | Additives/polyolefins | Weight (g) | PPM |
|---|---|---|---|
| 1 | PP random copolymer (PRCP) | 400 | — |
| 2 | Irganox 1010 (From Ciba Geigy Ltd) | 0.20 | 500 |
| 3 | Ultranox 626, Bis (2,4-Di-Tert-butylphenyl) Pentaerythritol diphosphite (From Ciba Geigy Ltd) | 0.32 | 800 |
| 4 | Hydrotalcite DHT 4A (Kyowa Chemical Ind. Co Ltd) | 0.08 | 200 |
| 5 | Calcium Stearate | 0.20 | 500 |
| 6 | Finastate 9500 (Glycerol Monostearate) | 0.16 | 400 |
| 7 | Nucleating agent | 0.80 | 2000 |

TABLE 2

Nucleating efficiency of metal salt nucleating agents in polypropylene

| S. No. | Compositions | (Tm, ° C.) | (Tc, ° C.) | Tm − Tc (° C.) |
|---|---|---|---|---|
| 1 | PRCP (virgin) - Reference | 149 | 109 | 40 |
| 2 | PRCP + sodium benzoate (Reference) | 149 | 115 | 34 |
| 3 | PRCP + potassium benzoate | 149 | 114 | 35 |
| 4 | PRCP + potassium cyclohexane carboxylate | 146 | 116 | 31 |
| 5 | PRCP + di-potassium salt of phenyl borate | 147 | 116 | 31 |
| 6 | PRCP + potassium nicotinate | 150 | 112 | 38 |

Samples 2-6 contain polypropylene random copolymer, nucleating agent and standard additives.

Yet other advantages of the present invention will become apparent to those skilled in the art from the foregoing description and drawings wherein there is described and shown a preferred embodiment of the present invention. As will be realized, the present invention is capable of various other embodiments and that its several components and related details are capable of various alterations, all without departing from the basic concept of the present invention. Accordingly, the drawings and descriptions will be regarded as illustrative in nature and not as restrictive in any form whatsoever. Modifications and variations of the process and methods described herein will be obvious to those skilled in the art. Such modifications and variations are intended to come within the scope of the present invention.

The invention claimed is:

1. A polyolefin composition having a peak crystallization temperature of at least 112° C., and comprising an aliphatic polyolefin, and 50 ppm to 10000 ppm by weight of potassium phenyl borate as a nucleating agent.

2. The polyolefin composition according to claim 1, wherein the aliphatic polyolefin is a homopolymer of propylene or a random copolymer of propylene having a non-propylene comonomer in an amount of at most 10 percent by weight of the copolymer.

3. The polyolefin composition according to claim 1, further comprising an additive comprising at least one of antioxidants, acid scavengers, and dispersing agents.

4. A method for preparing a polyolefin composition, comprising:
providing a random copolymer of propylene having a non-propylene comonomer in an amount of at most 10 percent by weight;
providing a potassium phenyl borate as a nucleating agent at 50 ppm to 10000 ppm by weight of the random copolymer;
providing additives comprising at least one of antioxidants, acid scavengers, and dispersing agents;
mixing the polypropylene random copolymer, the potassium phenyl borate and the additives to form a mixture; and
extruding the mixture to form a polyolefin composition, wherein the polyolefin composition has a peak crystallization temperature of at least 112° C.

5. A method for preparing a polyolefin composition, comprising:
providing a homopolymer of propylene;
providing a potassium phenyl borate as a nucleating agent at 50 ppm to 10000 ppm by weight of the homopolymer;
providing additives comprising at least one of antioxidants, acid scavengers, and dispersing agents;
mixing the homopolymer of propylene, the potassium phenyl borate and the additives to form a mixture; and
extruding the mixture to form a polyolefin composition, wherein the polyolefin composition has a peak crystallization temperature of at least 120° C.

* * * * *